April 14, 1942.  R. K. HERTEL  2,279,315

DRILLING HOOK

Filed June 13, 1941

RICHARD K. HERTEL,
INVENTOR

BY John D. Thennet

ATTORNEY.

Patented Apr. 14, 1942

2,279,315

UNITED STATES PATENT OFFICE 2,279,315

DRILLING HOOK

Richard K. Hertel, Los Angeles, Calif., assignor to Byron Jackson Co., Huntington Park, Calif., a corporation of Delaware Application June 13, 1941, Serial No. 397,859

7 Claims. (Cl. 294—82)

This invention relates generally to drilling hooks of the type used in drilling oil wells, and is directed particularly to improvements in a hook of the type disclosed in the patent to N. K. Smith, No. 1,825,018, issued September 29, 1931.

A hook of the type disclosed in the aforementioned patent comprises generally a supporting body in the form of a trunnion block and provided with laterally projecting trunnions for pivotally supporting the block at the lower extremities of the arms of an inverted U-shaped bail, a housing rotatably mounted on the upper side of the trunnion block between the bail arms and having one or more spring abutments formed on its inner wall, compression springs supported on the abutments, a hook shank extending through a central opening in the trunnion block and having a nut or other means forming a shoulder at the upper end thereof resting on the springs, and a hook body suspended from the lower end of the shank. Hooks of this type as heretofore constructed have embodied a hook body of the type known as a "Triplex" hook, including a single bail-receiving recess aligned with the longitudinal axis of the hook and adapted to receive the bail of a hydraulic rotary swivel during the drilling operation, and a pair of elevator link receiving recesses disposed at opposite sides of the hook axis and each adapted to receive an elevator link. A hook body of this type is quite massive, and its weight exceeds that of the spring housing, springs, and the portion of the hook shank projecting above the trunnion block. Consequently, the hook normally assumes a vertical position even when the elevator links and swivel bail are removed from the recesses. If, however, there were substituted a hook body of insufficient weight to counterbalance the weight of the parts above the trunnion block, the hook would tend to rotate about the trunnion axis and assume an inverted position when the bail recesses are empty.

A principal object of this invention is to prevent a hook of the foregoing type from tilting into an inverted position when equipped with a hook body of insufficient weight to counterbalance the weight of the parts above the trunnion axis.

It has been found that little if any tilting of the hook about the trunnion axis is required by present drilling practice. A slight amount of tilting is not objectionable since it provides, in conjunction with the tilting movement of the hook about its axis of pivotal connection with the hook shank, a universal joint in the hook which relieves the parts of bending stresses otherwise imposed thereon by the gyratory motion of the rotary swivel during the drilling operation. A further object of the invention is to limit the tilting movement of a hook of the aforementioned type to a negligible amount.

A still further object is to provide means associated with the bail of a hook of the foregoing type and cooperating with the rotatable spring housing for restraining the hook against substantial tilting movement about the trunnion axis, but without interfering with the rotation of the spring housing and associated parts relative to the bail.

A still further object of the invention is to provide a closure member for the upper extremity of the spring housing, which closure member also performs the additional function of restraining the hook against substantial tilting movement about the trunnion axis.

A still further object is to provide restraining means of the character described above which can be applied to hooks now in use without alteration of the existing construction.

Other objects and advantages will be apparent from the following detailed description of a preferred embodiment of the invention, reference being had to the accompanying drawing wherein.

Figure 1:
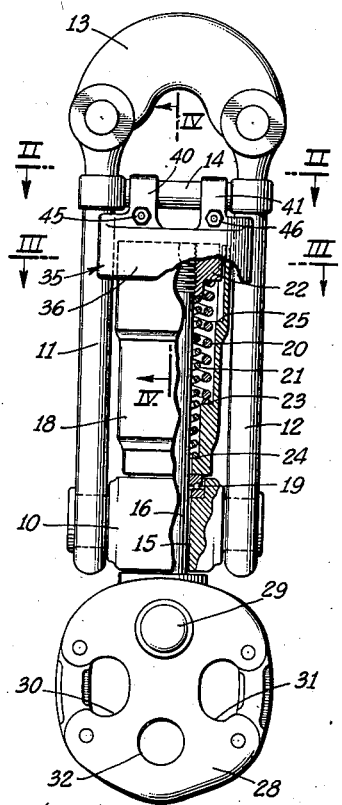
Fig. 1 is an elevation of a hook embodying the invention, with parts broken away to illustrate the internal construction of the spring housing.

Referring to Fig. 1 of the drawing, the reference numeral 10 designates a trunnion block provided with a pair of projecting trunnions journaled in eyes formed in the lower ends of the respective bail arms 11 and 12, the upper extremities of the arms being connected to a yoke 13 adapted to be supported by the usual traveling block. A strut or brace 14 extends between the bail arms adjacent their upper ends. The block 10 is provided with a central opening 15 therethrough, to slidably receive a hook shank 16.

A spring housing 18 is rotatably supported by the trunnion block 10 on an anti-friction bearing 19 housed within a recess in the upper surface of the block. In order to resiliently support the hook shank 16 in the housing for limited vertical movement relative thereto, a pair of compression springs 20 and 21 are interposed between a nut 22 threaded on the upper end of the shank and a pair of shoulders 23 and 24, respectively, formed on the inner wall of the housing 18. The downward travel of the shank is limited by engagement of the nut 22 with a stop shoulder 25. In order to constrain the housing 18 to rotate with the shank, the shank nut 22 is splined to the housing, as is most clearly shown in Fig. 3.

The construction described thus far is in all material respects substantially identical with that illustrated and described in the aforementioned Patent No. 1,825,018 to N. K. Smith. It will be noted, however, that in the instant disclosure a hook body 28, of different design and of materially smaller and lighter construction than that of the Smith patent, is secured to the lower end of the hook shank 16, as by a pin 29. In this hook body the main bail-receiving recess is omitted. A pair of elevator link receiving recesses 30 and 31 are adapted to receive the usual elevator links, the rotary swivel being supported by the links and the usual elevator attached thereto instead of being connected directly to the hook. An opening 32 is provided in the hook body for the reception of the pin of a clevis (not shown) in the event it is desired to connect a single-bail type of casing elevator to the hook.

Because of the reduction in the weight of the hook body by the elimination of the central hook portion thereof, its weight may possibly be less than that of the parts supported on the upper side of the trunnion block 10. Also, the center of mass of the hook body is closer to the trunnion axis than is the center of mass of the spring housing, springs, shank and shank nut. There is, therefore, a possibility that the pivotally supported assembly may tend to rotate about the trunnion axis into an inverted position when the elevator links are removed from the recesses 30 and 31. The novel means whereby this is prevented will now be described.

Figure 3:
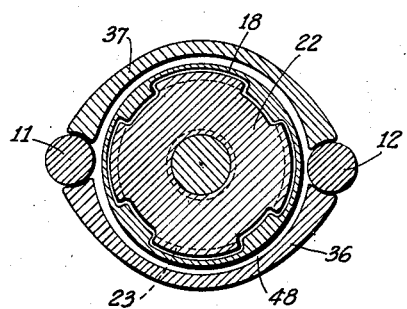
Fig. 3 is a horizontal sectional view taken on line III—III of Fig. 1.
Figure 4:
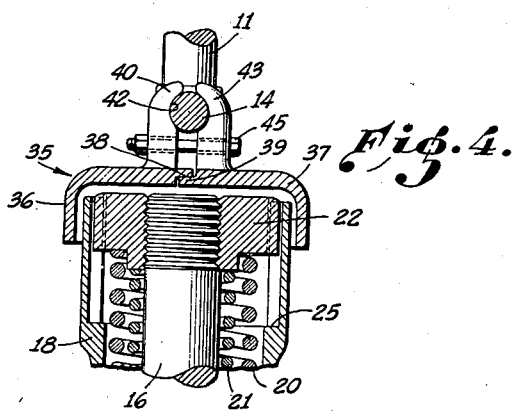
Fig. 4 is a fragmentary longitudinal sectional view taken on line IV—IV of Fig. 1.

An inverted cup-shaped closure and retainer member generally designated 35 is rigidly clamped to the bail brace 14 and to the bail arms 12 and 13 and, as shown most clearly in Fig. 4, loosely surrounds the upper extremity of the housing 18, forming a protective cap to exclude dirt and other foreign matter from the interior of the housing. The member 35 comprises two identical mating halves 36 and 37, each consisting of a semi-circular flat top portion and a semi-annular depending skirt portion. As seen most clearly in Figs. 2 and 3, the skirt portions extend outwardly at each side into contact with the bail arms 11 and 12, and thus, when the two sections are drawn tightly together in a manner to be presently described, they are rigidly clamped to the bail arms and supported thereby against tilting about the axis of the brace 14. The top portions meet in a diametric plane and are provided with overlapping flanges 38 and 39 to form a tight joint between the sections.

Figure 2:
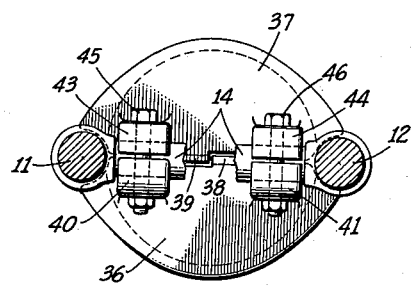
Fig. 2 is a plan view taken on line II—II of Fig. 1.

It will be observed, particularly with reference to Figs. 2 and 4, that the retainer and closure section 36 is provided with a pair of upstanding clamping brackets 40 and 41 having concave recesses 42 on their inner faces conforming to the contour of the brace 14. A similar pair of brackets 43 and 44 are formed on the section 37. The brackets 40 and 43 are clamped to opposite sides of the bail brace 14 by a clamping bolt 45, and the brackets 41 and 44 are similarly clamped to the brace by a bolt 46. As shown most clearly in Fig. 4, clearance is provided between the opposing edges of the overlapping flanges 38 and 39, to permit the clamping action of the bolts to be resisted solely by engagement of the brackets with the brace 14 and engagement of the skirt portions with the bail arms 11 and 12 (Fig. 3).

Ample clearance is provided at 48 (Figs. 3 and 4) between the spring housing 18 and the skirt portions of the member 35 to permit free rotation of the housing within the closure member, but tilting of the housing about the trunnion axis is substantially eliminated.

From the foregoing description, it will be apparent that a simple but effective means has been provided for avoiding undesirable tilting of the pivotally supported parts of the hook about the trunnion axis in the event the hook body is of insufficient weight to counterbalance the weight of the parts above the trunnion axis. The novel retainer and closure means is of such a nature that it requires no modification of the previous construction, thus rendering it possible to apply the retainer to a hook while in service. Its use is optional, of course, if the hook body is of such weight that it is not required, and by reason of the simple method of attachment it may be applied or removed by the drilling crew at the drilling site.

It will be understood that the specific embodiment illustrated and described is susceptible of modification in various respects, and hence the invention is not limited to the details of construction shown in the accompanying drawing, but is of the full scope of the appended claims.

I claim:

1. A hook structure comprising a bail adapted to be connected at its upper end to supporting means, a block having trunnions pivotally connected to the lower end of said bail, a stem extending through said block and having an abutment adjacent its upper end and a hook member connected to its lower end, a housing surrounding said stem and having an internal shoulder, bearing means rotatably mounting said housing on said block, spring means in said housing between said stem abutment and said shoulder, and means rigidly secured to said bail and loosely surrounding said housing for restraining said housing against substantial tilting movement relative to said bail about the axis of said trunnions while permitting rotation of said housing relative to said bail and said restraining means.

2. A hook structure comprising an inverted U-shaped bail having depending arms, a block having trunnions pivotally connected to the lower ends of said bail arms, a housing rotatably mounted on said block between said bail arms, a hook member below said block and having a stem extending upwardly through said block and supported by said housing for rotation therewith, and a sleeve member rigidly secured to said bail arms and loosely surrounding said housing, said sleeve member restraining said housing against substantial tilting movement relative to said bail arms about the axis of said trunnions while permitting said housing and hook member to rotate freely with respect to said bail and sleeve member.

3. A drilling hook comprising an inverted U-shaped bail having depending arms, a block having trunnions pivotally connected to the lower ends of said bail arms, a housing rotatably mounted on said block between said bail arms, a hook member below said block and having a stem extending upwardly through said block and supported by said housing, and a split sleeve member comprising a pair of segmental sections rigidly secured to opposite sides of said bail arms and loosely surrounding said housing to thereby restrain said housing against substantial tilting movement relative to said bail arms about the axis of said trunnions while permitting said housing to rotate freely with respect to said bail and sleeve member.

4. In a drilling hook, an inverted U-shaped bail having depending arms, a block pivotally connected to the lower ends of said arms, a housing rotatably supported on said block between said arms, a hook member below said block and having a stem extending through said block and supported in said housing, and a closure for the upper end of said housing, said closure comprising an inverted cup-shaped member loosely telescoped over the upper end of said housing and rigidly secured to said bail.

5. A drilling hook as defined in claim 4, in which said cup-shaped member comprised a pair of segmental sections rigidly clamped to opposite sides of said bail.

6. A drilling hook as defined in claim 4, in which said bail includes a strut member extending transversely between said bail arms, and in which said cup-shaped member includes bracket means secured to said strut member.

7. In a drilling hook, an inverted U-shaped bail including depending arms and a strut member extending transversely between said arms; a block having trunnions pivotally connected to said arms; a housing rotatably supported on said block between said arms; a hook member below said block and having a stem extending through said block and supported in said housing; and a closure for the upper end of said housing comprising a diametrically split, inverted cup-shaped member each section of which comprises a substantially flat top portion overlying said housing, a depending arcuate skirt portion loosely surrounding said housing and having terminal edges adapted to engage each of said bail arms at one side thereof, and a pair of upstanding brackets projecting upwardly from each section adjacent the meeting plane of said sections and adapted to engage one side of said strut member; and securing means extending between said sections for clamping the brackets of the respective sections to opposite sides of said strut member and clamping the terminal edges of the skirt portions thereof to opposite sides of said bail arms.

RICHARD K. HERTEL.